US011665087B2

(12) United States Patent
Mimura Gonzalez et al.

(10) Patent No.: US 11,665,087 B2
(45) Date of Patent: May 30, 2023

(54) TRANSPARENT SERVICE-AWARE MULTI-PATH NETWORKING WITH A FEATURE OF MULTIPLEXING (71) Applicant: International Business Machines Corporation, Armonk, NY (US)

(72) Inventors: Nelson Mimura Gonzalez, White Plains, NY (US); Tonia Elengikal, Long Island City, NY (US); Guojing Cong, Ossining, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 17/475,414

(22) Filed: Sep. 15, 2021

(65) Prior Publication Data
US 2023/0079088 A1 Mar. 16, 2023

(51) Int. Cl.
*H04L 45/24* (2022.01)
*H04L 45/00* (2022.01)

(52) U.S. Cl.
CPC .............. *H04L 45/24* (2013.01); *H04L 45/22* (2013.01)

(58) Field of Classification Search
None
See application file for complete search history.

(56) References Cited

U.S. PATENT DOCUMENTS

| | | | |
|---|---|---|---|
| 6,591,302 B2 | 7/2003 | Boucher | |
| 6,965,941 B2 | 11/2005 | Boucher | |
| 7,089,326 B2 | 8/2006 | Boucher | |
| 7,124,205 B2 | 10/2006 | Craft | |
| 7,272,139 B2 | 9/2007 | Fitzpatrick | |
| 7,337,241 B2 | 2/2008 | Boucher | |
| 7,539,185 B2 | 5/2009 | Shankar | |

(Continued)

FOREIGN PATENT DOCUMENTS

| CN | 1980106 A | 6/2007 |
|---|---|---|
| CN | 111406437 A | 7/2020 |

OTHER PUBLICATIONS

"PCT Notification of Transmittal of the International Search Report and the Written Opinion of the International Searching Authority, or the Declaration", International application No. PCT/EP2022/074973, International filing date Sep. 8, 2022, dated Nov. 25, 2022, 13 pages.

(Continued)

*Primary Examiner* — Xavier S Wong
(74) *Attorney, Agent, or Firm* — Edward P. Li (57) ABSTRACT

A computer-implemented method, a computer program product, and a computer system for multi-path networking with a feature of multiplexing. One or more computing devices or servers configure wrappers for respective ones of applications and run the applications with the wrappers preloaded to the respective ones of the applications. The wrappers establish communication through one or more alternative paths between wrapped applications, where the one or more alternative paths are parallel to an original path between the applications. The wrappers exchange data between the applications through either the one or more alternative paths or the original path. The wrappers finalize connections through the one or more alternative paths, in response to all the data being exchanged.

17 Claims, 8 Drawing Sheets

(56) References Cited

U.S. PATENT DOCUMENTS

| | | | |
|---|---|---|---|
| 7,647,523 B2 * | 1/2010 | Lindquist | H04L 67/02 |
| | | | 714/4.2 |
| 7,664,883 B2 | 2/2010 | Craft | |
| 8,340,109 B2 | 12/2012 | Quach | |
| 8,447,803 B2 | 5/2013 | Boucher | |
| 8,782,199 B2 | 7/2014 | Boucher | |
| 9,253,184 B1 | 2/2016 | Havemose | |
| 9,402,185 B2 | 7/2016 | Chen | |
| 9,621,384 B2 | 4/2017 | Sivakumar | |
| 10,708,640 B2 | 7/2020 | Chen | |
| 2002/0095519 A1 | 7/2002 | Philbrick | |
| 2002/0156927 A1 | 10/2002 | Boucher | |
| 2002/0188732 A1 | 12/2002 | Buckman | |
| 2003/0097489 A1 | 5/2003 | Nagarajayya | |
| 2008/0126553 A1 | 5/2008 | Boucher | |
| 2009/0073884 A1 | 3/2009 | Kodama | |
| 2011/0032942 A1 | 2/2011 | Matthews | |
| 2011/0141976 A1 | 6/2011 | Tan | |
| 2013/0136139 A1 | 5/2013 | Zheng | |
| 2014/0122544 A1 | 5/2014 | Tran | |
| 2014/0258720 A1 | 9/2014 | Black | |
| 2015/0194215 A1 | 7/2015 | Douglas | |
| 2017/0005911 A1 * | 1/2017 | Kasargod | H04L 45/42 |
| 2017/0041182 A1 | 2/2017 | Hanko | |
| 2019/0387082 A1 * | 12/2019 | Martinez-Heath | H04L 65/1069 |

OTHER PUBLICATIONS

Ammann, E., "Parallel Data Transfer Operations," IBM TDB, v.34, n.10B, Mar. 1992, IPCOM000107781D, IP.com, 2 pages.

Hsieh, Hung-Yun, et al., "Parallel Transport: A New Transport Layer Paradigm for Enabling Internet Quality of Service," IEEE Communications Magazine 43.4 (2005): 114-121.

Mell et al., "The NIST Definition of Cloud Computing", NIST, National Institute of Standards and Technology, Special Publication 800-145, Sep. 2011, 7 pages.

\* cited by examiner

TRANSPARENT SERVICE-AWARE MULTI-PATH NETWORKING WITH A FEATURE OF MULTIPLEXING

BACKGROUND

The present invention relates generally to a network of services, and more particularly to transparent service-aware multi-path networking with a feature of multiplexing.

Modern applications often are broken down as a network of services. The service-to-service communication can be coded into each service but typically is delegated to a service mesh. This service mesh is built into an application as an array of network proxies. These proxies, also referred to as sidecars, are responsible for routing requests and providing features such as security and observability. However, two issues may arise from this practice. An additional logical hop affects performance, both latency and bandwidth. The set of features and supported technologies, including communication, is restricted to what is provided by the sidecar.

To resolve the issues, technologies in the art focus on the following aspects: (1) hardware offloading to bypass or accelerate protocol-related operations; (2) protocol-specific methods, such as Internet Small Computer Systems Interface (iSCSI) and Hypertext Transfer Protocol (HTTP), to accelerate transfers using caching and/or hashing; (3) solutions that change the original communication path; (4) direct memory access based optimizations; (5) routing acceleration; (6) library preloading to implement encryption and decryption; and (7) library preloading to accelerate intra-node socket communication via interprocess doors.

SUMMARY

In one aspect, a computer-implemented method for multi-path networking with a feature of multiplexing is provided. The computer-implemented method includes configuring wrappers for respective ones of applications. The method further includes running the applications with the wrappers which are preloaded to the respective ones of the applications. The computer-implemented method further includes establishing, by the wrappers, communication through one or more alternative paths between wrapped applications, where the one or more alternative paths are parallel to an original path between the applications. The computer-implemented method further includes exchanging, by the wrappers, data between the applications through either the one or more alternative paths or the original path. The computer-implemented method further includes finalizing, by the wrappers, connections through the one or more alternative paths, in response to all the data being exchanged.

In another aspect, a computer program product for multi-path networking with a feature of multiplexing is provided. The computer program product comprises a computer readable storage medium having program instructions embodied therewith, and the program instructions are executable by one or more processors. The program instructions are executable to configure wrappers for respective ones of applications; run the applications with the wrappers which are preloaded to the respective ones of the applications; establish, by the wrappers, communication through one or more alternative paths between wrapped applications, where the one or more alternative paths are parallel to an original path between the applications; exchange, by the wrappers, data between the applications through either the one or more alternative paths or the original path; and finalize, by the wrappers, connections through the one or more alternative paths, in response to all the data being exchanged.

In yet another aspect, a computer system for multi-path networking with a feature of multiplexing is provided. The computer system comprises one or more processors, one or more computer readable tangible storage devices, and program instructions stored on at least one of the one or more computer readable tangible storage devices for execution by at least one of the one or more processors. The program instructions are executable to configure wrappers for respective ones of applications. The program instructions are further executable to run the application with the wrappers which are preloaded to the respective ones of the applications. The program instructions are further executable to establish, by the wrappers, communication through one or more alternative paths between wrapped applications, where the one or more alternative paths are parallel to an original path between the applications. The program instructions are further executable to exchange, by the wrappers, data between the applications through either the one or more alternative paths or the original path. The program instructions are further executable to finalize, by the wrappers, connections through the one or more alternative paths, in response to all the data being exchanged.

For configuring the wrappers, the computer-implemented method, computer program product, and the computer system further include determining at least one of following parameters: how many parallel paths are created, what interconnect is to be used for each alternative path, what communication protocol is to be used for each alternative path, what features are made available for each alternative path, what rules govern path multiplexing, whether multiple alternative paths are used at same time, and whether multiple alternative paths are used for same transfer of data between the applications.

For running the application with the wrappers, the computer-implemented method, computer program product, and the computer system further include initializing the wrappers by creating and defining global structures used by the wrappers, initializing the wrappers by creating and defining thread-local structures, and initializing the wrappers by creating function references to original functions of the original path.

For establishing the communication, the computer-implemented method, computer program product, and the computer system further include: calling, by a first application, an original function to establish a connection to a second application; determining, by the wrappers, whether the one or more alternative paths are to be created in parallel to the original path; in response to determining that the one or more alternative paths are to be created, calling, by the wrappers, a function to create the one or more alternative paths; connecting, by the wrappers, the first application and the second application through the one or more alternative paths; in response to determining that the one or more alternative paths are not to be created, calling, by the wrappers, an original function to establish the original path; and returning, by the wrapper, results to the first application, through the original path.

For exchanging the data, the computer-implemented method, computer program product, and the computer system further include: calling, by a first application, an original function to exchange data between the first application and a second application; determining, by the wrapper, whether there is data to be exchanged; in response to determining that there is still data to be exchanged, determining, based on wrapper parameters and logic, by the wrappers, either the one or more alternative paths or the original path is to be used for data exchange; adjusting, by the wrappers, the wrapper parameters, to meet requirements of either the one or more alternative paths or the original path; calling, by the wrappers, a function corresponding to either the one or more alternative paths or the original path, for the data exchange; and in response to determining that there is no further data to be exchanged, returning, by the wrappers, results to the first application.

DETAILED DESCRIPTION

Embodiments of the present invention disclose a method for transparently creating and using multiple communication paths with different properties to accelerate workloads, provide additional features, and make use of communication technologies the application does not originally support.

The present invention addresses the issues in the current service-to-service communication, by creating alternative paths that are associated to an original path. These alternative paths may be lighter than the original path and therefore with faster response and better throughput. These alternative paths provide features the original path does not have access to. These alternative paths make use of communication technologies the original path does not implement, such as other protocols and interconnects. Moreover, the alternative paths are created using a preloading-based mechanism in parallel to the original path. This ensures that communication properties are kept unchanged, such as source addresses and host addresses.

In embodiments of the present invention, data exchanges can be performed through multiple paths without data loss or synchronization issues, since the application buffer is managed by the disclosed method. This greatly amplifies a set of resources available to an application layer without requiring changes to applications or infrastructures, which benefits applications delivered as services (e.g., cloud computing) and any other applications that make use of networking resources (as a form of extending capabilities and improving performance).

The disclosed method in the present invention has the following features: transparent creation and management of multiple paths of communication are parallel to an original path; a library preloading based mechanism ensures that alternative paths are synchronized to an original path; preloaded data exchange functions are able to alternate between paths or even combine them to deliver higher throughput and/or expand the feature set exposed to an application layer; and service initiation may be kept intact by exchanging initial packets over an original path.

In the present invention, a preloading-based method for transparently creating and using multiple communication paths between two entities with different sets of features and underlying technologies. (1) Based on library calls originally made in application code, one or more alternative paths are created in parallel while maintaining connection-related aspects, such as a source or destination host (a machine) and application buffers. (2) Each alternative path may implement a different set of features; on one hand, this can be used to implement a fast path between two entities by providing a direct communication channel without any extra features; on the other hand, this can be used to extend features an application already provides, such as encryption and observability. (3) For each subsequent communication-related call, an appropriate path is used to exchange data. The selection of the appropriate path is based on user-defined and/or application-defined criteria. For instance, if the selection is based on the amount of data exchanged, the communication path is switched after a specific threshold is met. (4) Service initiation is kept intact. Based on the criteria above, specific parts of the communication can be kept unchanged and therefore the original path is used. For instance, the initial packets may be sent through the original channel to trigger proxy-based service initiation directives that are needed to properly start and complete a request.

The present invention therefore extends the concept of service-aware infrastructures by transparently providing a flexible set of features while not requiring a dedicated proxy, which may affect performance. Still, the present invention is capable enough to integrate to existing service infrastructures and proxies by allowing part of the traffic to traverse the original communication path. No modifications are needed at an application level, nor at an infrastructure (service) level. This can be used both to accelerate workloads and to provide features that a service layer may not currently offer.

Figure 1:
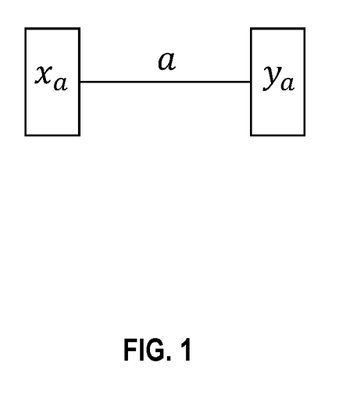
FIG. 1 illustrates a base scenario of a communication path between two applications.

FIG. 1 illustrates a base scenario of a communication path between two applications. The base scenario represents a conventional setup of two applications, $x_a$ and $y_a$, that exchange data over a network. For example, the two applications may be a client-server application pair. In another example, the two applications may be two distinct cloud services that must exchange data in order to implement application logic. Communication between applications $x_a$ and $y_a$ is over path a, and the communication over path a must be implemented and managed by application code.

Figure 2:
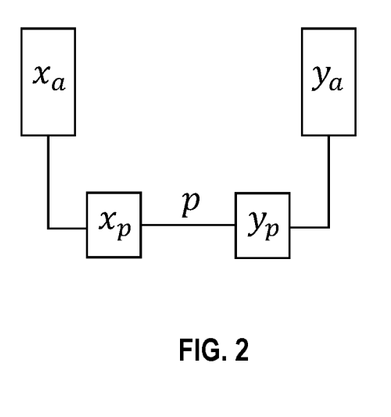
FIG. 2 illustrates a proxy scenario of a communication path between two applications.

FIG. 2 illustrates a proxy scenario of a communication path between two applications. The proxy scenario represents the typical setup of a service mesh. Communication logic is not handled by application code. Instead, communication is handled by proxies: proxy $x_p$ for application $x_a$ and proxy $y_p$ for application $y_a$. Proxy $x_p$ and proxy $y_p$ intermediates all exchanges between applications $x_a$ and $y_a$. Using some form of packet-based redirection (e.g., iptables), a proxy on one side intercepts outgoing calls, applies translation logic and other features that are relevant to the service mesh (e.g., security and observability), and sends traffic to the original destination through the proxy-based communication path p. A proxy on the other side intercepts incoming traffic, applies similar logic, and finally forwards packets to the original receiver.

Figure 3:
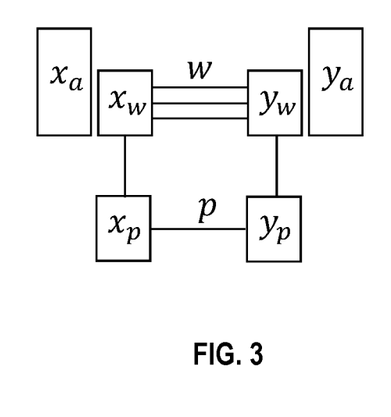
FIG. 3 illustrates a wrapper scenario of communication paths between two applications, in accordance with one embodiment of the present invention.

FIG. 3 illustrates a wrapper scenario of communication paths between two applications, in accordance with one embodiment of the present invention. The wrapper scenario includes one wrapper for each application, as shown in FIG. 3, wrapper $x_w$ for application $x_a$ and wrapper $y_w$ for application $y_a$. The wrappers are enabled via a library interposition mechanism that allows the wrappers to override existing function calls (for example LD_PRELOAD). Every communication related call is intercepted by the wrappers through this mechanism. For each of these calls, a wrapper library creates and manages alternative paths w parallel to an original path. These alternative paths w reuse, to some degree, the information about the original path, such as source and destination hosts. The alternative paths w may implement the same communication technology (i.e., protocols and interconnect) used by the original path; however, the alternative paths w may use different technologies from those used by the original path.

For each communication call (e.g., sends and receives, or reads and writes), the wrapper library is consulted to define whether the packet must be sent over the original path or over one of the parallel alternative paths. A set of packets may be transferred using one or more paths, including the original one. The decision may be based on the amount of data exchanged, on connection properties (e.g., a protocol used), or even on the contents of the exchanges.

The system and method of the wrapper scenario shown in FIG. 3 may be implemented on one or more computing devices or servers. A computing device or server is described in more detail in later paragraphs with reference to FIG. 8. The system and method of the wrapper scenario shown in FIG. 3 may be implemented in a cloud computing environment. The cloud computing environment is described in more detail in later paragraphs with reference to FIG. 9 and FIG. 10.

Figure 4:
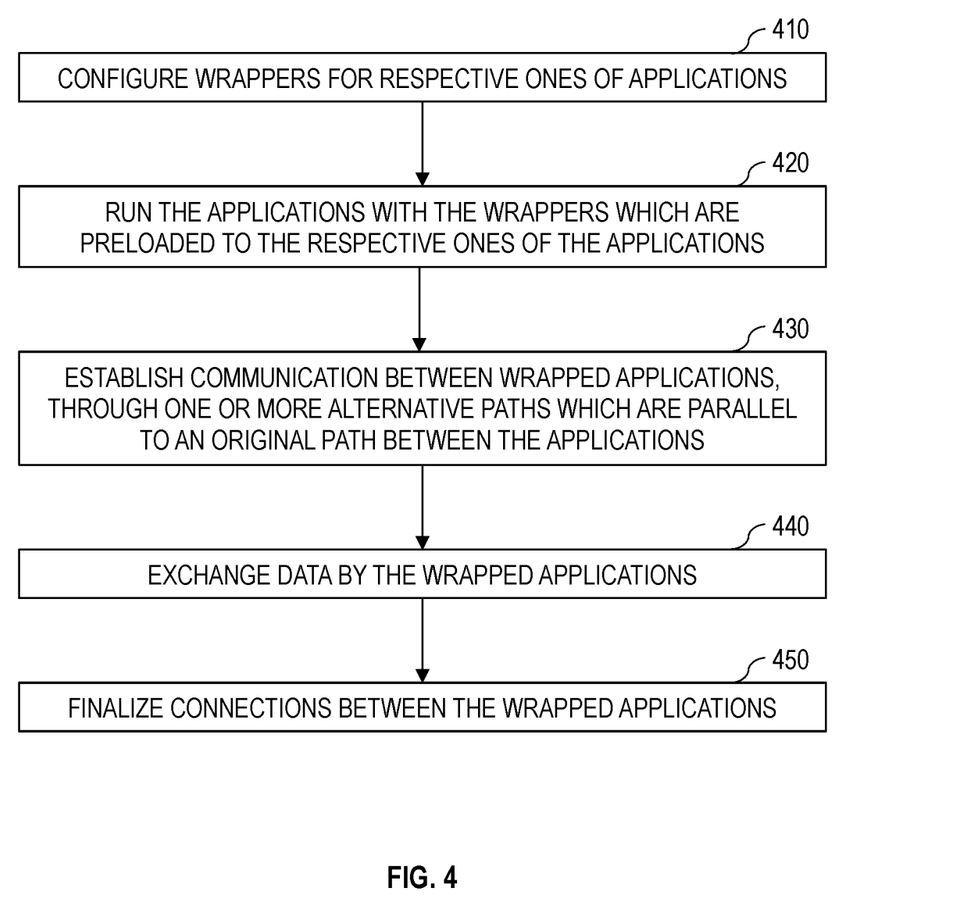
FIG. 4 is a flowchart showing operational steps of a wrapper scenario of communication paths between two applications, in accordance with one embodiment of the present invention.

FIG. 4 is a flowchart showing operational steps of a wrapper scenario of communication paths between two applications, in accordance with one embodiment of the present invention. At step 410, one or more computing devices or servers configure wrappers for respective ones of applications. In the example shown in FIG. 3, the computing devices or servers configure wrapper $x_w$ for application $x_a$ and wrapper $y_w$ for application $y_a$. This step is a wrapper set up phase. In the wrapper set up phase, the configuration of the wrappers may determine how many parallel paths are created; in the example shown in FIG. 3, three parallel alternative paths w are created. In the wrapper set up phase, the configuration of the wrappers may also determine at least one of the following parameters: what interconnect is to be used for each alternative path, what communication protocol is to be used for each path, what features are made available for each alternative path, what rules govern path multiplexing, whether multiple paths are used at the same time, and whether multiple paths are used for the same transfer of data between the applications.

At step 420, the one or more computing devices or servers run the applications with the wrappers which are preloaded to the respective ones of the applications. In the example shown in FIG. 3, the computing devices or servers run application $x_a$ with preloaded wrapper $x_w$ and application $y_a$ with preloaded wrapper $y_w$. This step is an execution phase. In the execution phase, the LD_PRELOAD mechanism available on a Unix system may be used. The execution phase may also be done by compiling the application while linking the wrapper library in an appropriate build phase. In the execution phase, another possibility for interpreted libraries is importing wrapper libraries so that whatever communication functions are overridden by the wrappers. Detailed description of the execution phase will be discussed in later paragraphs with reference to FIG. 5.

At step 430, wrapped applications (the applications preloaded with the wrappers) establish communication between the wrapped applications, through one or more alternative paths which are parallel to an original path between the applications. In the example shown in FIG. 3, the communication between the wrapped applications $x_a+x_w$ and $y_a+y_w$ are established through alternative paths w; the alternative paths w are parallel to the original path p between applications $x_a$ and $y_a$. This step is a connection phase. The connection phase varies according to the original path technology used. For example, for TCP/IP sockets, the connection phase is done by a set of coordinated calls to functions such as socket( ), connect( ), bind( ), listen( ), and accept( ). Since the other application has been executed with a wrapper library, these calls used to establish communication also create alternative communication paths. The connection phase will be discussed in detail in later paragraphs with reference to FIG. 6.

Once the communication is established at step 430, at step 440, the wrapped applications exchange data. Exchanging data between the wrapped applications are through the one or more alternative paths or the original path. In the example shown in FIG. 3, the wrapped applications $x_a+x_w$ and $y_a+y_w$ exchange data through the alternative paths w or the original path p between applications $x_a$ and $y_a$. This step is an exchange phase. Each wrapped application may send and receive data in the exchange phase, typically in the form of packets or segments of data. Since each call made to send and receive data is wrapped, each call can be further controlled in terms of whether the alternative paths should be used, which features should be applied to traffic and packets, and what rules should govern these exchanges until they are finished. The exchange phase will be discussed in detail in later paragraphs with reference to FIG. 7.

After exchanging all data needed at step 440, at step 450, the wrapped applications finalize connections between the wrapped applications. This step triggers cleanup phase directives for the alternative paths created by the wrappers. In the example shown in FIG. 3, the wrapped applications $x_a+x_w$ and $y_a+y_w$ finalize the connection through the alternative paths w.

Figure 5:
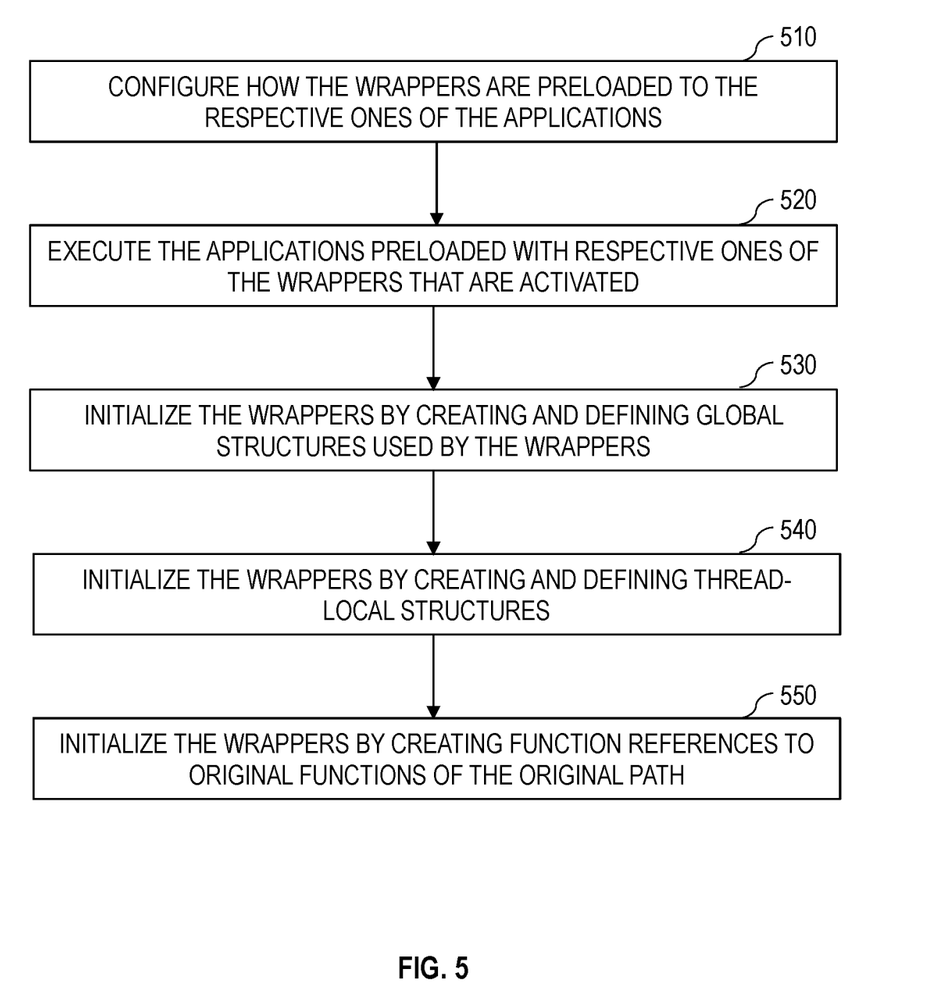
FIG. 5 is a flowchart showing operational steps of an execution phase in a wrapper scenario of communication paths between two applications, in accordance with one embodiment of the present invention.

FIG. 5 is a flowchart showing operational steps of an execution phase in a wrapper scenario of communication paths between two applications, in accordance with one embodiment of the present invention. At step 510, the one or more computing devices or servers configure how the wrappers are preloaded to the respective ones of the applications. For example, step 510 typically involves using some form of the LD_PRELOAD mechanism or directly linking and/or using the wrapper component in the application executable. In the example shown in FIG. 3, the one or more computing devices or servers configure how the wrapper $x_w$ is preloaded to the application $x_a$ and how the wrapper $y_w$ is preloaded to the application $y_a$.

At step 520, the one or more computing devices or servers execute the applications preloaded with respective ones of the wrappers that are activated. In the example shown in FIG. 3, the one or more computing devices or servers start the application $x_a$ preloaded with the wrapper $x_w$ and the application $y_a$ preloaded with the wrapper $y_w$.

At step 530, the one or more computing devices or servers initialize the wrappers by creating and defining global structures used by the wrappers. Once the wrapped applications are started, the wrappers automatically are initialized. The global data structures used by the wrappers include lists and maps of communication paths (the alternative paths w in the example shown in FIG. 3) that must be defined once the original path (the original path p in the example shown in FIG. 3) is created.

At step 540, the one or more computing devices or servers initialize the wrappers by creating and defining thread-local structures. The thread-local structures provide further support for multi-threaded applications. Creating and defining the thread-local structures ensures, for instance, the ability to properly map resources defined in a control (main) thread to resources that are to be used by a worker thread. Creating and defining the thread-local structures also ensures that the alternative paths match the original path on a per-thread pair basis.

At step 550, the one or more computing devices or servers initialize the wrappers by creating function references to original functions of the original path. The original functions are interposed by one or more wrapper libraries. Creating the function references to the original functions allows calling these original functions from the wrapper code. The original functions are the ones that actually implement the logic to establish connections and exchange data, for instance.

Figure 6:
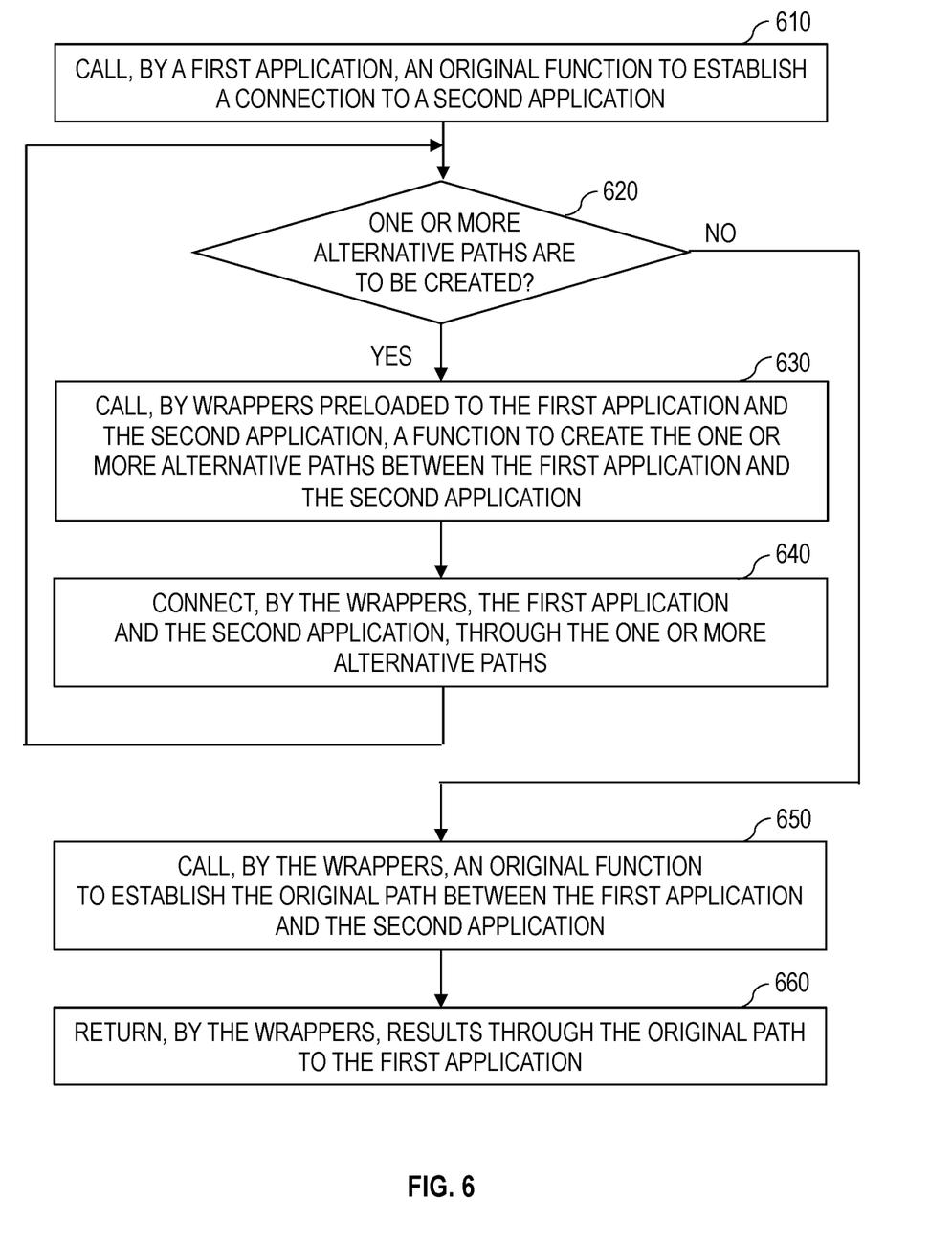
FIG. 6 is a flowchart showing operational steps of a connection phase in a wrapper scenario of communication paths between two applications, in accordance with one embodiment of the present invention.

FIG. 6 is a flowchart showing operational steps of a connection phase in a wrapper scenario of communication paths between two applications, in accordance with one embodiment of the present invention. At step 610, a first application calls an original function to establish a connection to a second application. In the example shown in FIG. 3, the application $x_a$ may call to establish a connection to the application $y_a$, and vice versa.

At step 620, wrappers preloaded to the first application and the second application determine whether the one or more alternative paths are to be created in parallel to the original path between the applications. In the example shown in FIG. 3, the wrapper $x_w$ preloaded to the application $x_a$ and the wrapper $y_w$ preloaded to the application $y_a$ determine whether the alternative paths w are to be created in parallel to the original path p.

In response to determining that the one or more alternative paths are to be created (YES branch of decision step 620), at step 630, the wrappers call a function to create the one or more alternative paths between the first application and the second application. For each alternative path to be created, a function is called to create the alternative path. The function depends on the interconnect and protocol to be used. For instance, the socket( ) function is called to create a TCP/IP socket, or the rsocket( ) function is called to create an remote direct memory access (RDMA) based InfiniBand communication channel. InfiniBand is a computer networking communications standard. At step 630, the wrappers complete any setup required by a set of features to be included in the one or more alternative paths. For instance, this may include seed initialization for an encryption library or proper data structures for metering and observability. At step 640, the wrappers connect the first application and the second application, through the one or more alternative paths.

In response to determining that the one or more alternative paths are not to be created (NO branch of decision step 620), at step 650, the wrappers call an original function to establish the original path between the first application and the second application. In the example shown in FIG. 3, the wrapper $x_w$ and the wrapper $y_w$ call the original function to establish the original path p.

At step 660, the wrappers return results through the original path to the first application (which is a caller). The last step involves returning results from the original function call to the caller—the application code. This ensures that all operations executed in the connection phase are transparent to the application code. Errors are raised to the caller when appropriate and using the mechanisms that the application code understands (i.e., error codes that the original function library supports).

Figure 7:
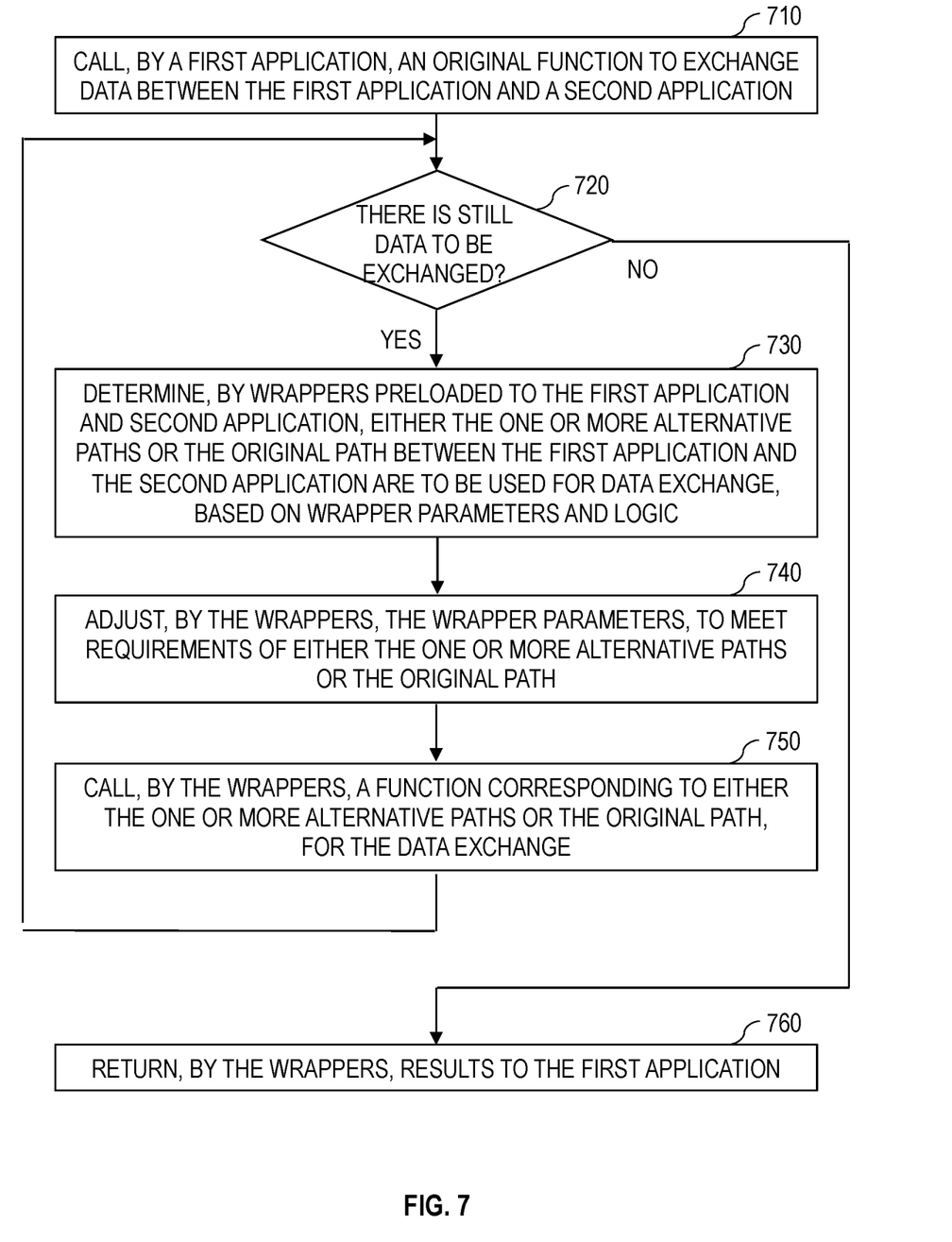
FIG. 7 is a flowchart showing operational steps of an exchange phase in a wrapper scenario of communication paths between two applications, in accordance with one embodiment of the present invention.

FIG. 7 is a flowchart showing operational steps of an exchange phase in a wrapper scenario of communication paths between two applications, in accordance with one embodiment of the present invention. At step 710, a first application calls an original function to exchange data between the first application and a second application. In the example shown in FIG. 3, the application $x_a$ may call to exchange the data between the first application and the second application, and vice versa. The process starts when the first application calls a data exchange function from an original library.

At step 720, wrappers preloaded to the first application and second application determine whether there is still data to be exchanged. In the example shown in FIG. 3, the wrapper $x_w$ preloaded to the application $x_a$ and the wrapper $y_w$ preloaded to the application $y_a$ determine whether there is data to be exchanged between the application $x_a$ and the application $y_a$. The decision typically is straightforward at the beginning of data exchange—there should be data to send and/or receive. However, after the first calls are made, depending on how the exchange logic is implemented, the function may return the amount of bytes effectively exchanged with the remote counterpart. This number of bytes may be lower than the total amount to be exchanged. Consequently, this control is necessary to ensure whether the data transfer is completed.

In response to determining that there is no further data to be exchanged (NO branch of decision step 720), at step 760, the wrappers return results to the first application (which is a caller). In the example shown in FIG. 3, the wrapper $x_w$ preloaded to the application $x_a$ and the wrapper $y_w$ return the results to the application $x_a$ (which is a caller making the call at step 710). Once the exchange is finished (or there is no further data to be exchanged), the results must be returned to the caller. Similar to step 660 in the connection phase shown in FIG. 6, step 760 ensures that the application code receives a consistent result after the call is completed.

In response to determining that there is still data to be exchanged (YES branch of decision step 720), at step 730, the wrappers determines either the one or more alternative paths or the original path between the first application and the second application are to be used for data exchange, based on wrapper parameters and logic. In the example shown in FIG. 3, the wrapper $x_w$ and the wrapper $y_w$ determines either the alternative paths w or the original path p is to be used for the data exchange. Wrapper parameters (user setups) and logic are used to determine which path(s) are to be used for the data exchange. For instance, the wrappers are configured to use an original path until the amount of bytes exchanged reaches a certain threshold. Once the threshold is met, an alternative path (provided by the wrappers) will be used. In this case, the wrappers have been previously configured with regard to the operation mode and the threshold value. The exchange logic is responsible for keeping track of the number of bytes exchanged. Once the threshold is met, the wrapper multiplexer switches to the alternative path.

At step 740, the wrappers adjust the wrapper parameters, to meet requirements of either the one or more alternative paths or the original path. Each path has specific requirements to be met and requires modifications to be made in the exchange parameters. For instance, using the same example from step 730, if an alternative path must be used based on a threshold controlled by the number of bytes exchanged, then the number of bytes exchanged over an original path must not exceed that threshold. The exchange parameters are therefore modified to exchange only up to THE threshold bytes before switching to the alternative path.

At step 750, the wrappers call a function corresponding to either the one or more alternative paths or the original path, for the data exchange. At this step also includes selecting features for either the one or more alternative paths or the original path. For instance, if either the one or more alternative paths or the original path must provide encryption, an appropriate call to an encryption library (e.g., OpenSSL) must be made to protect traffic.

Figure 8:
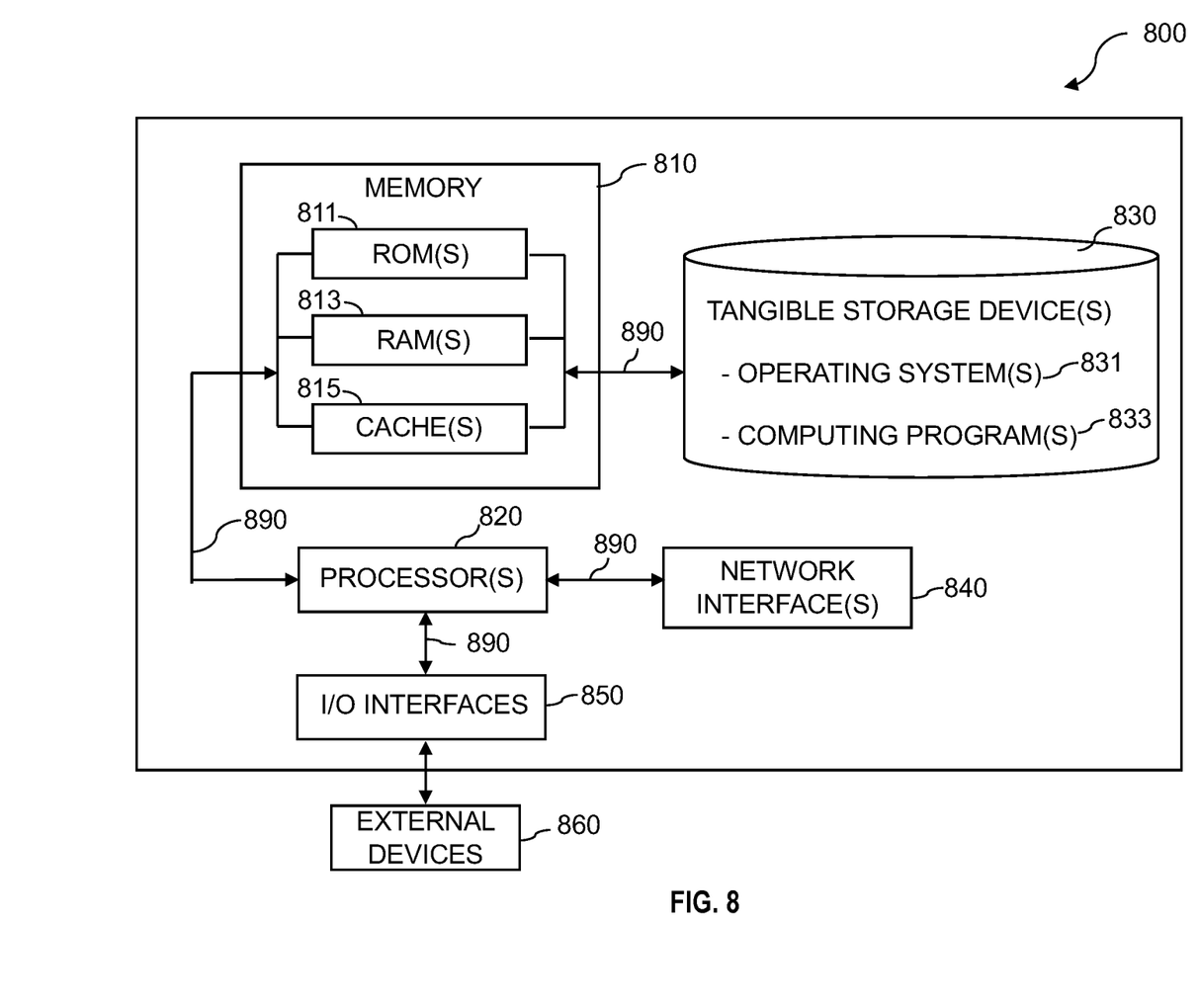
FIG. 8 is a diagram illustrating components of a computing device or server, in accordance with one embodiment of the present invention.

FIG. 8 is a diagram illustrating components of computing device or server 800, in accordance with one embodiment of the present invention. It should be appreciated that FIG. 8 provides only an illustration of one implementation and does not imply any limitations with regard to the environment in which different embodiments may be implemented.

Referring to FIG. 8, computing device or server 800 includes processor(s) 820, memory 810, and tangible storage device(s) 830. In FIG. 8, communications among the above-mentioned components of computing device or server 800 are denoted by numeral 890. Memory 810 includes ROM(s) (Read Only Memory) 811, RAM(s) (Random Access Memory) 813, and cache(s) 815. One or more operating systems 831 and one or more computer programs 833 reside on one or more computer readable tangible storage device(s) 830.

Computing device or server 800 further includes I/O interface(s) 850. I/O interface(s) 850 allows for input and output of data with external device(s) 860 that may be connected to computing device or server 800. Computing device or server 800 further includes network interface(s) 840 for communications between computing device or server 800 and a computer network.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the C programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 9:
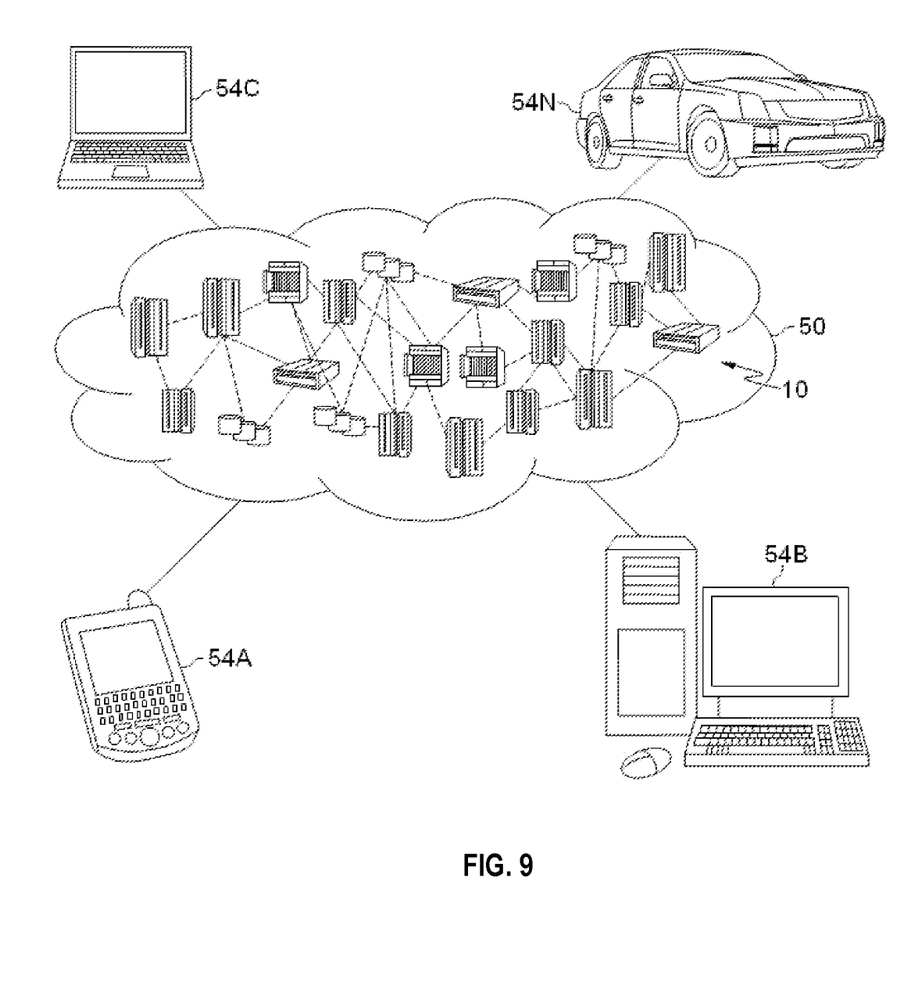
FIG. 9 depicts a cloud computing environment, in accordance with one embodiment of the present invention.

Referring now to FIG. 9, illustrative cloud computing environment 50 is depicted. As shown, cloud computing environment 50 includes one or more cloud computing nodes 10 with which local computing devices are used by cloud consumers, such as mobile device 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N are intended to be illustrative only and that computing nodes 10 and cloud computing environment 50 can communicate with any type of computerized device over any type of network and/or network addressable connection (e.g., using a web browser).

Figure 10:
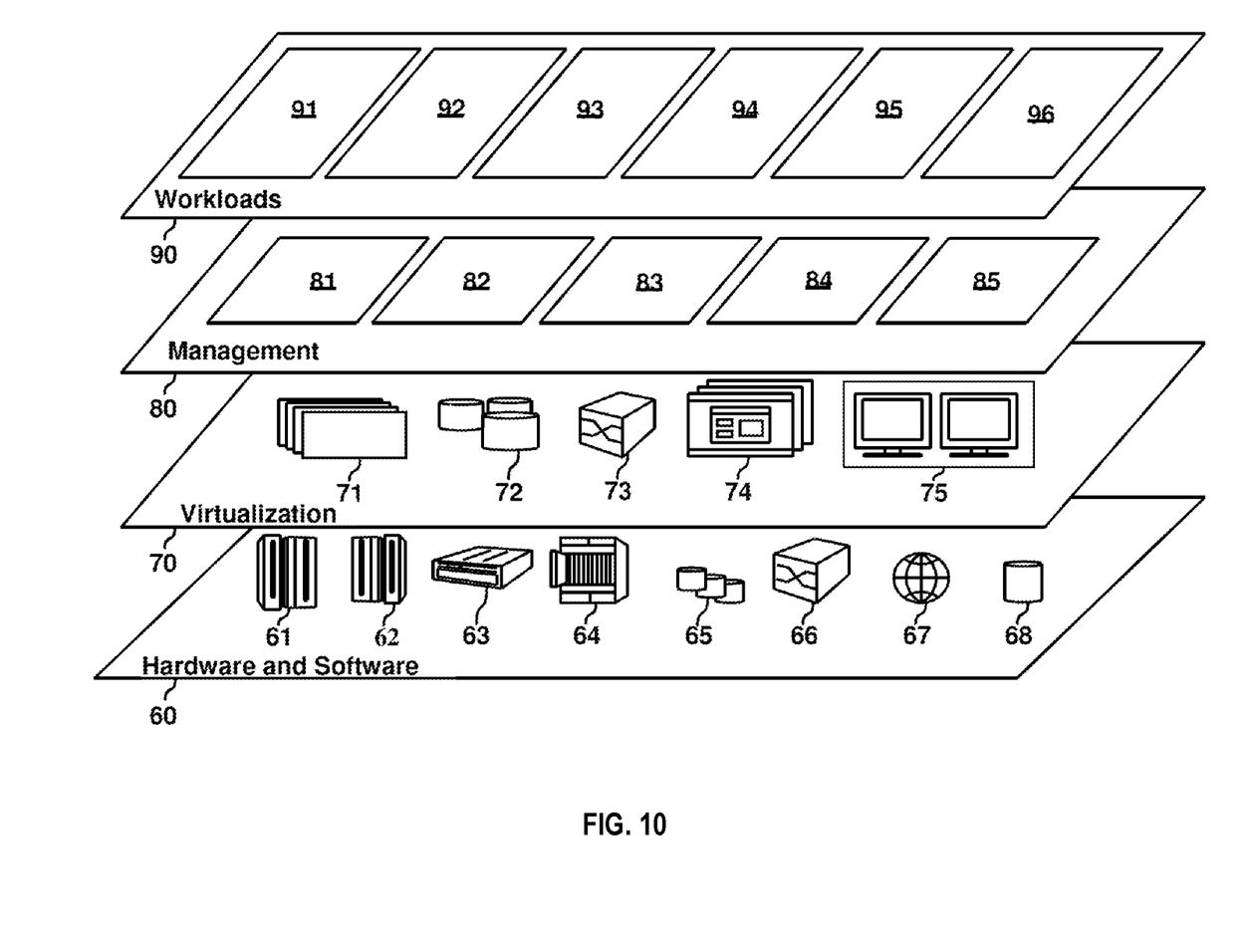
FIG. 10 depicts abstraction model layers in a cloud computing environment, in accordance with one embodiment of the present invention.

Referring now to FIG. 10, a set of functional abstraction layers provided by cloud computing environment 50 (FIG. 9) is shown. It should be understood in advance that the components, layers, and functions shown in FIG. 10 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and function 96. Function 96 in the present invention is the functionality of transparent service-aware multi-path networking with a feature of multiplexing.

What is claimed is:

1. A computer-implemented method for multi-path networking with a feature of multiplexing, the method comprising:
    configuring wrappers for respective ones of applications;
    running the applications with the wrappers which are preloaded to the respective ones of the applications;
    establishing, by the wrappers, communication through one or more alternative paths between wrapped applications, the one or more alternative paths being parallel to an original path between the applications;
    calling, by a first application, an original function to establish a connection to a second application;
    determining, by the wrappers, whether the one or more alternative paths are to be created in parallel to the original path;
    in response to determining that the one or more alternative paths are to be created, calling, by the wrappers, a function to create the one or more alternative paths;
    connecting, by the wrappers, the first application and the second application through the one or more alternative paths;
    exchanging, by the wrappers, data between the applications through either the one or more alternative paths or the original path; and
    finalizing, by the wrappers, connections through the one or more alternative paths, in response to all the data being exchanged.

2. The computer-implemented method of claim 1, configuring the wrappers further comprising:
    determining at least one of following parameters: how many parallel paths are created, what interconnect is to be used for each alternative path, what communication protocol is to be used for each alternative path, what features are made available for each alternative path, what rules govern path multiplexing, whether multiple alternative paths are used at same time, and whether multiple alternative paths are used for same transfer of data between the applications.

3. The computer-implemented method of claim 1, running the application with the wrappers further comprising:
    initializing the wrappers by creating and defining global structures used by the wrappers;
    initializing the wrappers by creating and defining thread-local structures; and
    initializing the wrappers by creating function references to original functions of the original path.

4. The computer-implemented method of claim 1, further comprising:

in response to determining that the one or more alternative paths are not to be created, calling, by the wrappers, an original function to establish the original path; and returning, by the wrapper, results to the first application, through the original path.

5. The computer-implemented method of claim 1, exchanging the data further comprising:

calling, by a first application, an original function to exchange data between the first application and a second application;

determining, by the wrapper, whether there is still data to be exchanged;

in response to determining that there is still data to be exchanged, determining, by the wrappers, based on wrapper parameters and logic, either the one or more alternative paths or the original path is to be used for data exchange;

adjusting, by the wrappers, the wrapper parameters, to meet requirements of either the one or more alternative paths or the original path; and calling, by the wrappers, a function corresponding to either the one or more alternative paths or the original path, for the data exchange.

6. The computer-implemented method of claim 5, further comprising:

in response to determining that there is no further data to be exchanged, returning, by the wrappers, results to the first application.

7. A computer program product for multi-path networking with a feature of multiplexing, the computer program product comprising a computer readable storage medium having program instructions embodied therewith, the program instructions executable by one or more processors, the program instructions executable to:

configure wrappers for respective ones of applications;

run the applications with the wrappers which are preloaded to the respective ones of the applications;

establish, by the wrappers, communication through one or more alternative paths between wrapped applications, the one or more alternative paths being parallel to an original path between the applications;

call, by a first application, an original function to establish a connection to a second application;

determine, by the wrappers, whether the one or more alternative paths are to be created in parallel to the original path;

in response to determining that the one or more alternative paths are to be created, call, by the wrappers, a function to create the one or more alternative paths;

connect, by the wrappers, the first application and the second application through the one or more alternative paths;

exchange, by the wrappers, data between the applications through either the one or more alternative paths or the original path; and finalize, by the wrappers, connections through the one or more alternative paths, in response to all the data being exchanged.

8. The computer program product of claim 7, for configuring the wrappers, further comprising the program instructions executable to:

determine at least one of following parameters: how many parallel paths are created, what interconnect is to be used for each alternative path, what communication protocol is to be used for each alternative path, what features are made available for each alternative path, what rules govern path multiplexing, whether multiple alternative paths are used at same time, and whether multiple alternative paths are used for same transfer of data between the applications.

9. The computer program product of claim 7, for running the application with the wrappers, further comprising the program instructions executable to:

initialize the wrappers by creating and defining global structures used by the wrappers;

initialize the wrappers by creating and defining thread-local structures; and initialize the wrappers by creating function references to original functions of the original path.

10. The computer program product of claim 7, further comprising program instructions executable to:

in response to determining that the one or more alternative paths are not to be created, call, by the wrappers, an original function to establish the original path; and return, by the wrapper, results to the first application, through the original path.

11. The computer program product of claim 7, for exchanging the data, further comprising program instructions executable to:

call, by a first application, an original function to exchange data between the first application and a second application;

determine, by the wrapper, whether there is still data to be exchanged;

in response to determining that there is still data to be exchanged, determine, by the wrappers, based on wrapper parameters and logic, either the one or more alternative paths or the original path is to be used for data exchange;

adjust, by the wrappers, the wrapper parameters, to meet requirements of either the one or more alternative paths or the original path; and call, by the wrappers, a function corresponding to either the one or more alternative paths or the original path, for the data exchange.

12. The computer program product of claim 11, further comprising the program instructions executable to:

in response to determining that there is no further data to be exchanged, return, by the wrappers, results to the first application.

13. A computer system for multi-path networking with a feature of multiplexing, the computer system comprising one or more processors, one or more computer readable tangible storage devices, and program instructions stored on at least one of the one or more computer readable tangible storage devices for execution by at least one of the one or more processors, the program instructions executable to:

configure wrappers for respective ones of applications;

run the applications with the wrappers which are preloaded to the respective ones of the applications;

establish, by the wrappers, communication through one or more alternative paths between wrapped applications, the one or more alternative paths being parallel to an original path between the applications;

call, by a first application, an original function to establish a connection to a second application;

determine, by the wrappers, whether the one or more alternative paths are to be created in parallel to the original path;

in response to determining that the one or more alternative paths are to be created, call, by the wrappers, a function to create the one or more alternative paths;

connect, by the wrappers, the first application and the second application through the one or more alternative paths;

exchange, by the wrappers, data between the applications through either the one or more alternative paths or the original path; and finalize, by the wrappers, connections through the one or more alternative paths, in response to all the data being exchanged.

14. The computer system of claim 13, for configuring the wrappers, further comprising the program instructions executable to:

determine at least one of following parameters: how many parallel paths are created, what interconnect is to be used for each alternative path, what communication protocol is to be used for each alternative path, what features are made available for each alternative path, what rules govern path multiplexing, whether multiple alternative paths are used at same time, and whether multiple alternative paths are used for same transfer of data between the applications.

15. The computer system of claim 13 for running the application with the wrappers, further comprising the program instructions executable to:

initialize the wrappers by creating and defining global structures used by the wrappers;

initialize the wrappers by creating and defining thread-local structures; and initialize the wrappers by creating function references to original functions of the original path.

16. The computer system of claim 13, further comprising program instructions executable to:

in response to determining that the one or more alternative paths are not to be created, call, by the wrappers, an original function to establish the original path; and return, by the wrapper, results to the first application, through the original path.

17. The computer system of claim 13, for exchanging the data, further comprising program instructions executable to:

call, by a first application, an original function to exchange data between the first application and a second application;

determine, by the wrapper, whether there is still data to be exchanged;

in response to determining that there is still data to be exchanged, determine, by the wrappers, based on wrapper parameters and logic, either the one or more alternative paths or the original path is to be used for data exchange;

adjust, by the wrappers, the wrapper parameters, to meet requirements of either the one or more alternative paths or the original path;

call, by the wrappers, a function corresponding to either the one or more alternative paths or the original path, for the data exchange; and in response to determining that there is no further data to be exchanged, return, by the wrappers, results to the first application.

* * * * *